United States Patent [19]

Egerer

[11] 4,287,658

[45] Sep. 8, 1981

[54] APPARATUS FOR MAKING HEAT-INSULATED STRUCTURAL SECTION ASSEMBLIES

[75] Inventor: Rudolf Egerer, Bellengerg, Fed. Rep. of Germany

[73] Assignee: Wieland-Werke Aktiengesellschaft, Ulm, Fed. Rep. of Germany

[21] Appl. No.: 39,401

[22] Filed: May 15, 1979

[30] Foreign Application Priority Data

Jun. 9, 1978 [DE] Fed. Rep. of Germany ....... 2825301

[51] Int. Cl.[3] ...................... B21D 39/00; B23K 25/00; B23P 19/04

[52] U.S. Cl. ................................. 29/509; 29/243.58; 72/191

[58] Field of Search .................. 29/509, 155 R, 243.5, 29/243.58; 52/403; 49/DIG. 1; 72/191, 214, 220, 208, 70

[56] References Cited

U.S. PATENT DOCUMENTS

| | | | |
|---|---|---|---|
| 1,503,862 | 8/1924 | Sutherland et al. | 29/243.58 |
| 1,743,477 | 1/1930 | Perkins | 29/243.58 X |
| 2,097,899 | 11/1937 | Smith | 72/70 X |
| 3,065,678 | 11/1962 | Armstrong | 72/208 X |
| 3,143,009 | 8/1964 | Pfeiffer | 72/191 |
| 3,722,052 | 3/1973 | Toti | 29/155 R |
| 3,992,769 | 11/1976 | Jackson | 29/155 R X |
| 3,999,354 | 12/1976 | Anter et al. | 29/155 R X |
| 4,021,909 | 5/1977 | Bollmer | 29/243.58 X |
| 4,188,705 | 2/1980 | Jackson | 29/509 X |
| 4,194,284 | 3/1980 | Diels et al. | 29/509 |

*Primary Examiner*—Lowell A. Larson

*Attorney, Agent, or Firm*—Ladas & Parry

[57] ABSTRACT

The invention relates to apparatus for making a heat-insulated structural section assembly for use in window and door frames consisting of at least two structural metal sections transversely connected to each other by at least one heat-insulating bar and including at least one pressure roller which is adapted to apply pressure against a flange on the structural section in order to hold the heat-insulating bar firmly in place. The improvement resides in the provision of oblique, parallel grooves in the peripheral surfaces of said pressure roller, oriented at an acute angle to the direction of rotation of the pressure roller.

4 Claims, 4 Drawing Figures

APPARATUS FOR MAKING HEAT-INSULATED STRUCTURAL SECTION ASSEMBLIES

CROSS-REFERENCES TO RELATED APPLICATIONS

In my co-pending prior application Ser. No. 967,536 filed Dec. 7, 1978, I disclose a method and apparatus for making a heat-insulated structural section assembly for use in window and door frames consisting of two structural metal sections transversely connected to each other by a pair of parallel, plastic heat-insulating bars spaced from each other and having longitudinal ends of swallow-tail cross-sectional shape which are successively received between pairs of longitudinally extending opposite grooves each defined by upper and lower flanges in said structural sections. This pair of heat-insulating bars defines an enclosed space, and said grooves loosely receiving first one of said heat-insulating bars are closed upon said one heat-insulating bar by continuously pressing said upper flanges of the respective grooves against said one heat-insulating bar.

In this prior application, I disclose a pair of pressure rollers which are vertically adjustable to apply pressure against the flanges in the structural sections in order to hold the heat-insulating bars firmly in place.

BACKGROUND OF THE INVENTION

In the apparatus as disclosed in my said prior application, the pressure rollers have smooth rims and it is possible for the pressure rollers to slide off the flanges so that a defective joint is produced between the heat-insulating bars and the structural metal sections.

It is the object of the invention to improve my prior apparatus in such a manner that the pressure rollers steadily and without fail bear against the flanges throughout the formation of the structural section assembly.

BRIEF SUMMARY OF THE INVENTION

According to the invention, I provide in apparatus for making a heat-insulated structural section assembly for use in window and door frames consisting of at least two structural metal sections transversely connected to each other by at least one heat-insulated bar and including at least one pressure roller which is adapted to apply pressure against a flange on the structural section in order to hold the heat-insulating bar firmly in place, wherein the improvement resides in the provision of oblique, parallel grooves in the peripheral surfaces of said pressure roller, oriented at an acute angle to the direction of rotation of the pressure roller.

The grooves or indentations in the periphery of the pressure roller or rollers are oriented at an angle between 20° and 60° to the direction of travel of the metal sections, but an angle of 45° is preferred. The invention is not limited to the use of two parallel heat-insulating bars, but the provision of the oblique peripheral grooves in the roller(s) works equally well with a single heat-insulating bar.

The effectiveness of the grooved pressure roller(s) is independent of the width of the roller, but rather depends on the degree with which the grooved pressure roller bites into the flange or flanges on the metal sections. Instead of grooves (which are indented), the pressure roller(s) could be provided with raised lands which would bite equally well into the flanges of the metal sections, which are usually made of aluminum or other light metal. The term "groove" when used herein thus includes raised lands.

Irrespective of the diameter of the pressure roller or rollers, the distance between the grooves should be between 2 and 6 mm as if greater the effectiveness is reduced. The grooves or indentations or raised lands have preferably a rectangular cross-section as the sharp corners of the cross-section will enhance the biting action of the pressure roller or rollers.

The depth and width of the grooves is between 0.5 and 1.5 mm. The grooves are easily formed by cutting or milling into the peripheries of the rollers.

The invention will now be described in greater detail with reference to the accompanying drawings showing a preferred embodiment thereof.

DETAILED DESCRIPTION

Figure 1:
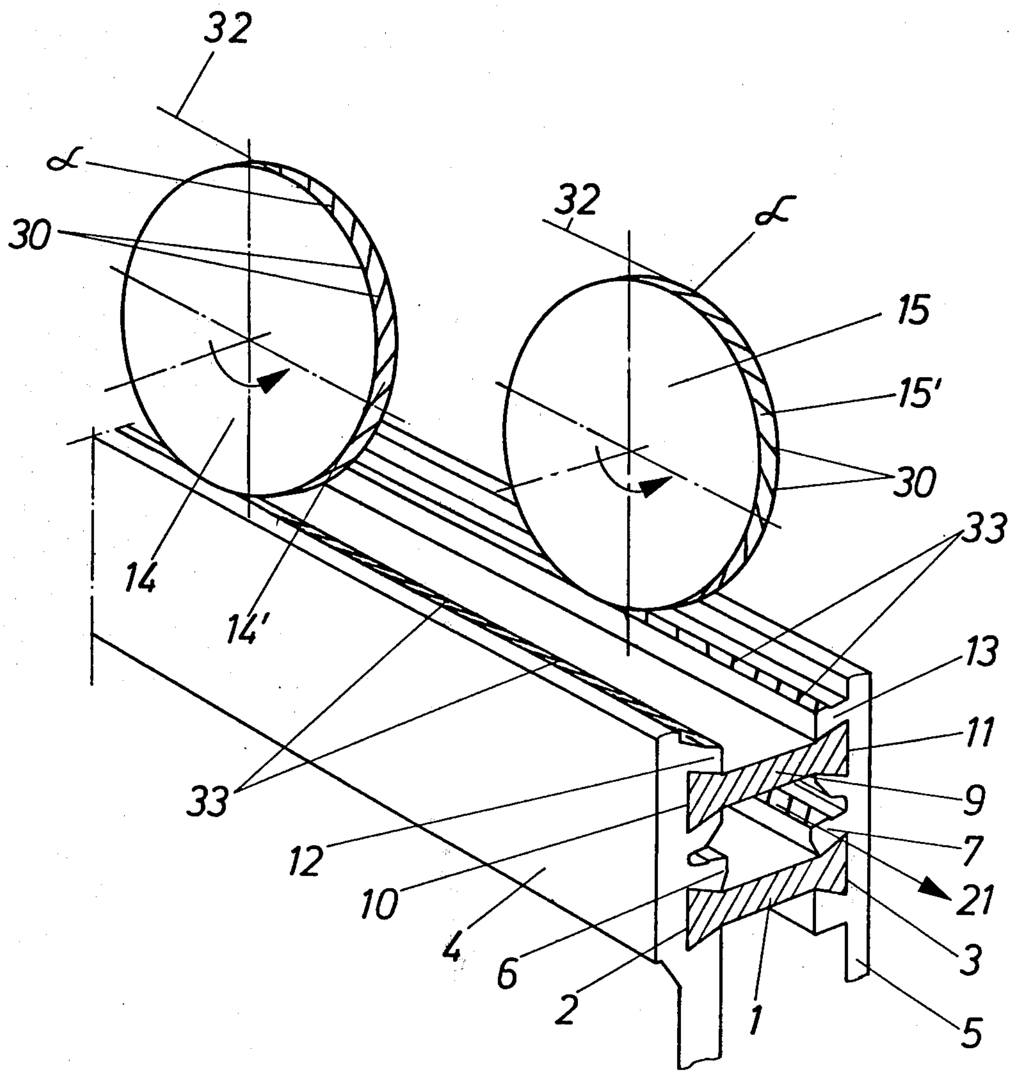
FIG. 1 shows a perspective view, partly in section of the improved apparatus of the invention for making heat-insulated structural sections.

Referring to FIG. 1 of the drawings, it will be seen that the apparatus of the invention for making the heat-insulated structural sections consists essentially of two vertically adjustable pressure rollers 14 and 15, which are arranged one behind the other in the direction of travel of the section (indicated by arrow 21). In the arrangement show in FIG. 1, a first lower insulating bar 1 has been securely inserted between grooves 2 and 3 of metal sections 4 and 5. Flanges 6 and 7 which define the upper walls of grooves 2 and 3 have already been bent down and are firmly pressed against the lower heat-insulating bar 1 by the action of pressure rollers.

A second, upper heat-insulating bar 9 has also been pulled into place between opposing grooves or cavities 10 and 11 of metal sections 4 and 5. The arrangements shown in FIG. 1 illustrates the manner in which upper flanges 12 and 13 are forced against the upper side of the upper heat-insulating bar 9 by pressure rollers 14 and 15. The direction of rotation of the pressure rollers 14, 15 as indicated by arrows on each pressure roller is anti-clockwise in the view of FIG. 1 and the direction in which the formed section assembly is advanced is indicated by arrow 21. (The feed rollers are omitted from this view for the sake of clarity.)

In order to ensure that the flanges 12, 13 are forced down against the upper heat-insulating bar 9 without faulty, spots the peripheral surfaces 14' and 15' of the pressure rollers 14 and 15 are formed with oblique, parallel grooves or indentations 30 which are oriented at an angle to the axis of the rollers.

Figure 3:
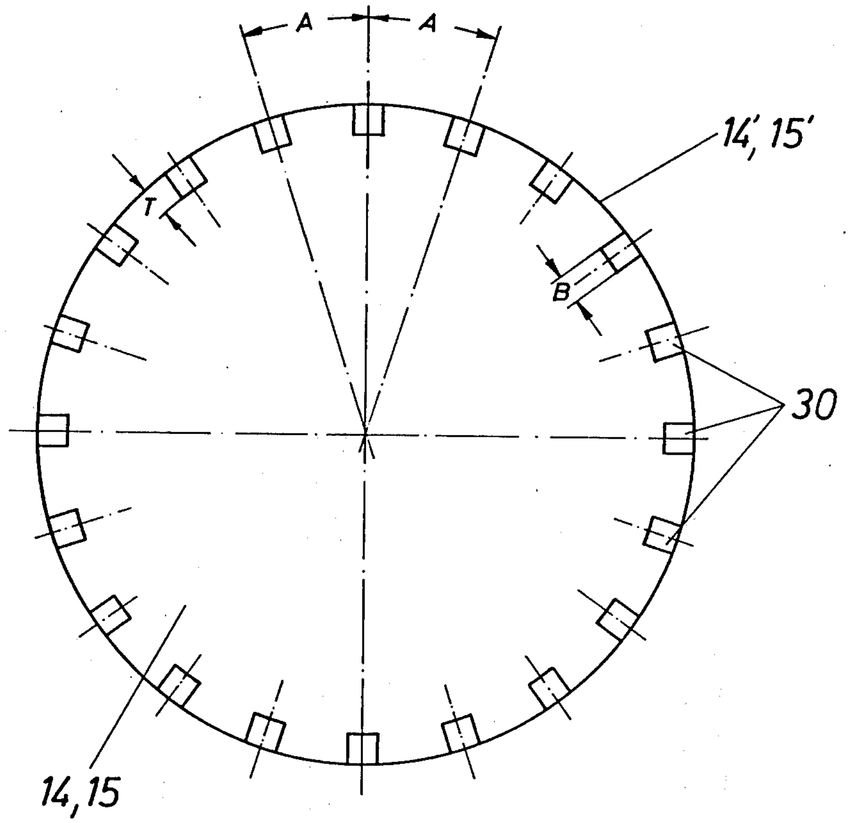
FIG. 3 shows a longitudinal section through one of the pressure rollers.

The distance A, between adjacent grooves, the width B, and depth T of the individual grooves are illustrated clearly in FIG. 3.

Figure 2:
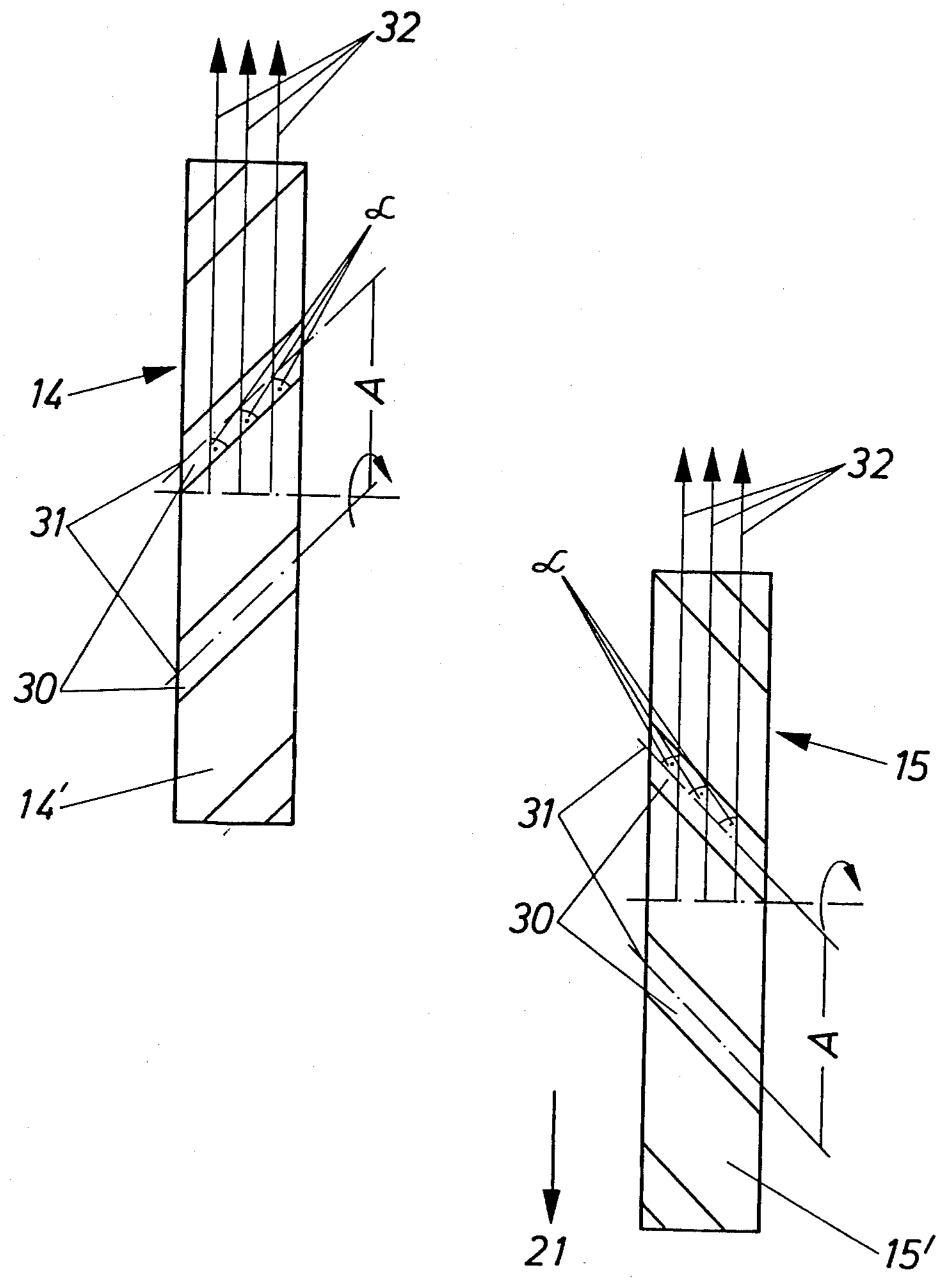
FIG. 2 shows the two pressure rollers from above.

As shown clearly in FIG. 2, seen in the direction of rotation of the pressure rollers 14, 15, the longitudinal axes 31 of the grooves 30 form acute angles alpha $\alpha$ with the straight line 32 tangential to and pointing in the direction of rotation of the pressure rollers 14 and 15. The tangent 32 and angle $\alpha$ are also shown in FIG. 1.

This angle $\alpha$ on one of the pressure rollers thus opens towards the other pressure roller, which is towards the same side as the grooves 2, 10 or 3, 11 of the profiled section 4 or 5 which are contacted by the pressure rollers 14 and 15 respectively. The grooves 30 are thus directed towards each other in a V-shaped formation against the feed direction 21 of the metal sections.

In the embodiment shown, the grooves 30 are rectangular in section (as seen in FIG. 3) and when forced against flanges 6, 7 or 12, 13 form correspondingly shaped raised areas 33, the depth (or height) of which naturally depends on the pressure applied by roller 14, 15. The raised area 33 in the feed direction 21 of the metal sections point toward each other in V-formation or herring-bone fashion.

The provision of grooves 30 ensures that the pressure rollers are firmly and securely held with their peripheral surfaces against flanges 6, 7 or 12, 13 and the rollers are prevented from sliding off the flange surfaces.

Figure 4:
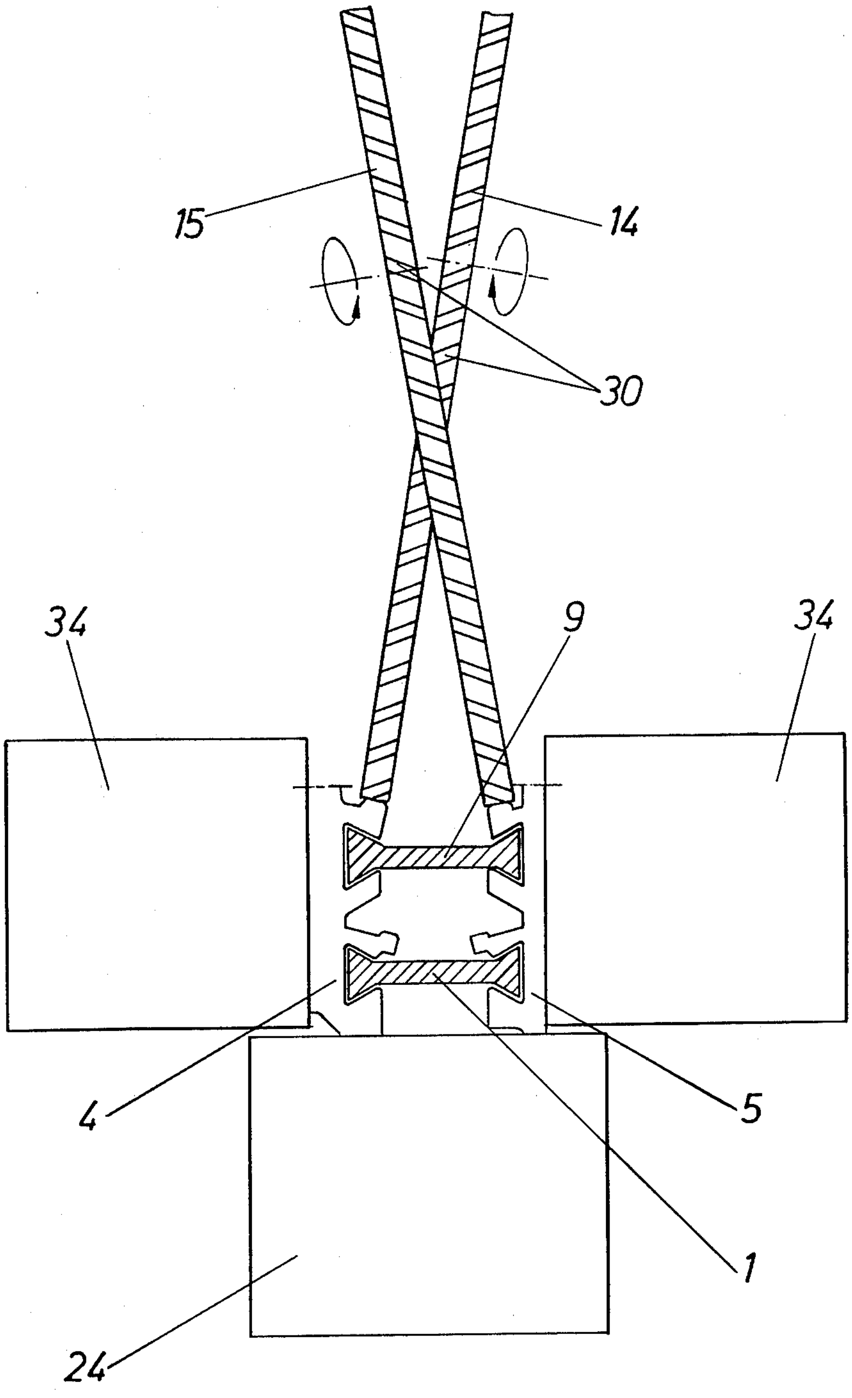
FIG. 4 shows a vertical section through a heat-insulated structural section and the apparatus for making the section.

FIG. 4 shows a vertical section through the pressure rollers 14, 15, the structural sections and adjacent guide and feed rollers.

As shown, the pressure roller 14, 15 are slightly inclined to the vertical. The metal sections 4, 5 are guided laterally between guide rollers 34, indicated in outline.

In the preferred embodiment, the pressure rollers 14, 15 are made from tool steel with a diameter of about 100 mm and a thickness of a few millimeters. The steel feed rollers 24 which are located below the metal sections and again shown in outline, only have a diameter of about 200 mm. The guide rollers 34 located on either side of metal sections 4, 5 are made from plastic and have a diameter of about 100 mm.

Depending on the thickness of the light alloy metal sections 4 and 5, the thickness of rollers 24 varies between 50 and 150 mm and the thickness of guide rollers 34 between 30 and 60 mm.

The rectangular groove 30 in the periphery of the pressure rollers 14, 15 are inclined at an angle $\alpha$ of 20° to 60° and have a depth T and a width B between 0.5 and 1.5 mm, preferably about 1 mm. The distance A between adjacent grooves is between 2 and 6 mm, preferably about 4 mm.

I claim:

1. Apparatus for making a heat-insulated structural section assembly consisting of at least two spaced facing structural metal sections transversely connected to each other by at least one heat-insulating bar having end portions retained in cavities defined by inwardly directed flanges on said spaced facing metal sections, said apparatus including at least one pressure roller for applying pressure against a flange on the structural section in order to hold the heat-insulating bar firmly in place within the respective cavity, each said pressure applying roller being rotatable to make rolling contact with the section assembly as said assembly travels through the apparatus and having a plurality of oblique substantially parallel grooves formed in the rolling surface thereof, each said groove having a longitudinal axis disposed at an acute angle with respect to the plane in which said roller rotates and being disposed in such manner that the acute angle faces forwardly and outwardly from the cavity when moving into rolling contact with the flange.

2. Apparatus as claimed in claim 1, wherein the grooves are oriented at an angle between 20° and 60° to the direction of travel of the metal sections.

3. Apparatus as claimed in claim 1, wherein the grooves have a rectangular cross-section.

4. Apparatus for making a heat-insulated structural section assembly consisting of two structural metal sections transversely connected to each other by a pair of parallel heat-insulating bars held between flanges integrally formed on said metal sections, said apparatus including a pair of inclined pressure rollers which are vertically adjustable to apply pressure against said flanges, each of said rollers having a plurality of oblique substantially parallel grooves formed in the rolling surface thereof, each said groove having a longitudinal axis oriented at an acute angle with respect to the plane of roller rotation, the grooves in opposed rollers being directed towards each other in V-formation.

* * * * *